United States Patent [19]

Loshaek et al.

[11] 4,405,773
[45] Sep. 20, 1983

[54] HYDROPHYLIC CONTACT LENSES AND METHODS FOR MAKING SAME

[75] Inventors: Samuel Loshaek; Chah M. Shen, both of Chicago, Ill.

[73] Assignee: Schering Corporation, Kenilworth, N.J.

[21] Appl. No.: 346,323

[22] Filed: Feb. 5, 1982

[51] Int. Cl.$^3$ .................. C08F 220/20; C08F 220/28
[52] U.S. Cl. ............................ 526/317; 351/160 R; 351/160 H; 523/106
[58] Field of Search .......................... 526/317, 320; 351/160 R, 160 H; 523/106

[56] References Cited

U.S. PATENT DOCUMENTS

| | | | |
|---|---|---|---|
| 3,780,003 | 12/1973 | Seymour et al. | 526/320 |
| 3,876,581 | 4/1975 | Neogi | 523/106 |
| 3,985,697 | 10/1976 | Urbach | 264/1 |
| 4,028,295 | 6/1977 | Loshaek | 526/320 |
| 4,038,264 | 7/1977 | Rostoker et al. | 526/320 |
| 4,109,070 | 8/1978 | Loshaek et al. | 526/320 |

FOREIGN PATENT DOCUMENTS 1500692 2/1978 United Kingdom .

*Primary Examiner*—Harry Wong, Jr.
*Attorney, Agent, or Firm*—Warrick E. Lee, Jr.; Vincent H. Gifford; Bruce M. Eisen

[57] ABSTRACT

Hydrophilic contact lenses produced by polymerizing
(a) hydroxyalkyl monoesters of acrylic or methacrylic acid,
(b) monomers having the formula

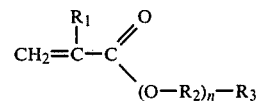

where $R_1$ is hydrogen or methyl, $R_2$ is alkylene, $R_3$ is alkoxy and n is 1 or 2, and
(c) acrylic acid or methacrylic acid.

Methods of producing the lenses are disclosed.

16 Claims, No Drawings

HYDROPHYLIC CONTACT LENSES AND METHODS FOR MAKING SAME

This invention relates to hydrophilic contact lenses having high water content, high oxygen permeability, and good mechanical properties. High oxygen permeability is a very desirable property in contact lenses, since the cornea must receive a certain amount of oxygen from the atmosphere for comfort and to avoid damage. High oxygen permeability permits longer wearing times.

U.S. Pat. No. 4,028,295 discloses contact lenses made by copolymerizing two monomers, such as hydroxyethyl methacrylate and ethoxyethyl methacrylate. Such lenses are hydrophilic, that is, they may be hydrated with aqueous liquid to form a soft hydrogel. These lenses have good properties; however, lenses having even higher oxygen permeability and water content are desirable for increased comfort.

It has been unexpectedly found that by adding a small amount of a third monomer to the two monomers of U.S. Pat. No. 4,028,295, and by confining the concentrations of all three monomers within specific ranges and ratios, it is possible to produce a lens having significantly improved oxygen permeability and water content over those taught by the patent. Furthermore, lenses of the present invention have desirable mechanical properties, such as tensile strength and elongation at break, despite their higher water content. Another advantage is that the lenses of the present invention comprise a major amount of the two monomers of U.S. Pat. No. 4,028,295, which are known to be acceptable for use in contact with the cornea.

One aspect of the present invention is summarized by:

A hydrophilic contact lens comprising the polymerization reaction product of monomers comprising by weight on a water-free basis:

(a) 75 to 95 percent hydroxy straight-or-branched-chain $C_2$-$C_4$ alkyl monoester of acrylic or methacrylic acid;

(b) 5 to 20 percent monomer having the formula

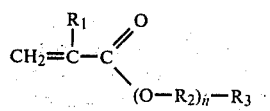

wherein $R_1$ is hydrogen or methyl, $R_2$ is $C_2$-$C_4$ straight-or-branched-chain alkylene, $R_3$ is $C_2$ to $C_4$ straight-or-branched-chain alkoxy, and n is 1 or 2; and (c) 0.3 to 4 percent acrylic acid or methacrylic acid, wherein the weight ratio of (b) to (c) is no higher than 25 to 1.

Other aspects of the invention includes buttons or bonnets made by polymerizing (a), (b), and (c) and methods for making the polymer.

DETAILED DESCRIPTION OF THE INVENTION

The contact lenses of this invention are formed by polymerizing a mixture comprising three monomers.

The first monomer is hydroxy $C_2$-$C_4$ straight-or-branched-chain alkyl monoester of acrylic or methacrylic acid. Suitable first monomers include hydroxyethyl methacrylate, hydroxypropyl acrylate, hydroxypropyl methacrylate, hydroxybutyl acrylate and the like. The most preferred first monomer is hydroxyethyl methacrylate, having the formula

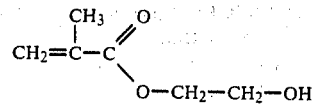

The polymerization mixture will contain by weight on a water-free basis 75 to 95 percent of the first monomer, more preferably 87 to 93 percent.

The second monomer has the formula

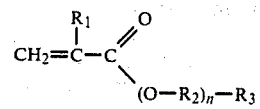

wherein $R_1$ is hydrogen or methyl, $R_2$ is $C_2$-$C_4$ straight-or-branched-chain alkylene, $R_3$ is $C_1$-$C_4$ straight-or-branched-chain alkoxy, and n is 1 or 2. Suitable second monomers include ethoxyethyl methacrylate, ethoxyethyl acrylate, isobutoxypropyl methacrylate, butoxy carbitol methacrylate having the formula

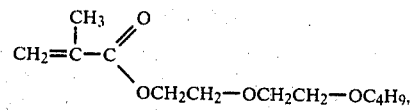

and the like. The preferred second monomer is ethoxyethyl methacrylate having the formula

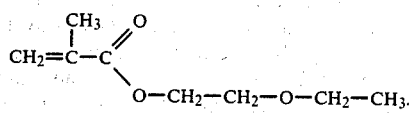

The polymer will contain by weight on a water-free basis 5 to 20 percent of the second monomer, more preferably 7 to 12 percent, most preferably 8 to 10 percent.

The third monomer is acrylic or methacrylic acid, with methacrylic acid, having the formula

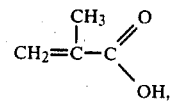

being preferred. The amount of third monomer, by weight on a water-free basis will be 0.3 to 4 percent, more preferably 0.5 to 3 percent, most preferably 0.5 to 2.5 percent.

To achieve optimal properties the weight ratio of the amounts of second monomer to third monomer should be no higher than 25 to 1, more preferably no higher than 20 to 1.

Minor amounts of other monomers and other expedients, such as cross linking agents, may be added to the polymerization mixture. It is desirable to add a small amount of free radical initiator to carry out the polymerization.

Prior to polymerization it is preferable to remove glycol diester of acrylic or methacrylic acid from the first monomer. This can be accomplished by the extraction technique disclosed in U.S. Pat. No. 4,028,295, the content of which is incorporated herein by reference. All of the publications mentioned in this specification are incorporated herein by reference.

It is also preferable to individually subject the monomers to the vacuum distillation technique described in U.S. Pat. No. 4,109,070, in order to obtain better optical properties in the finished lens.

After pretreatment the monomers may be mixed and placed in a glass tube for polymerization. A small amount of free-radical initiator, such as benzoyl peroxide, isopropylperoxy dicarbonate or azobisisobutyronitrile, is added to the mixture.

Polymerization takes place by subjecting the mixture to temperature ranging from 10° to 90° C. The reaction times may vary widely depending on temperatures, initiator concentration, and monomers used, with anywhere from 1 to 12 days being the usual time to complete polymerization.

After polymerization the glass tube is broken, leaving a rod of the hydrophilic polymer. The rod is cut into buttons or bonnets which may be machined into contact lenses by techniques well known in the art. The lenses are then hydrated with aqueous saline solution.

Alternately polymerization may take place in a lens mold.

EXAMPLE I

Hydroxyethyl methacrylate is purified by the extraction technique described in U.S. Pat. No. 4,028,295, column 2 line 55, to column 3, line 35. The amount of ethylene glycol dimethacrylate is reduced to less than 0.1 weight percent by this process.

Ethoxyethyl methacrylate and the purified hydroxyethyl methacrylate are individually subjected to the vacuum distillation technique described in U.S. Pat. No. 4,109,070. Ethoxyethyl methacrylate monomer is vacuum distilled at 1–2 mm Hg absolute pressure and 40° to 45° C. into a receiver. Hydroxyethyl methacrylate monomer containing less than 0.1 percent ethylene glycol dimethacrylate is vacuum distilled at 0.1 to 0.2 mm Hg absolute pressure and 35° to 40° C. into a receiver.

A polymerization mixture containing the following is prepared:
(a) 87.9 parts by weight hydroxyethyl methacrylate (purified and vacuum distilled as described above)
(b) 9.8 parts by weight ethoxyethyl methacrylate (vacuum distilled as described above)
(c) 2.2 parts by weight methacrylic acid, and
(d) 0.1 parts by weight azobisisobutyronitrile (tradenamed VAZO-64, as polymerization initiator).

The mixture is sealed in a glass tube and the tube is placed in a constant temperature water bath at 35° C. for about 7 days. The tube is then transferred to an oven and the temperature is raised in steps to 90° C. over a period of about 48 hours. The oven is allowed to cool, and the tube is removed from the oven. The glass rod is broken and a rod of solid polymer is obtained.

The rod is cut into bonnets whose shape is disclosed in U.S. Pat. No. 3,162,985 as element B of FIG. 1 therein. The bonnet is then machined into a contact lens by techniques well known in the art. Alternately, the rod may be cut into flat cylindrical disks, known in the art as buttons, and the buttons machined into contact lenses.

The contact lens made by machining the bonnet or button is hydrated by soaking in physiological saline. After hydration the water content is about 55 percent, based on the total weight of the hydrated lens. The oxygen permeability constant at 21° C. is about $14.5 \times 10^{-11}$ (cm$^2$ ml O$_2$)/(sec ml mmHg). When the hydrated lens is subjected to elongation it does not break until elongation is about 200 to 400 percent of its original length. The lens has excellent optical properties.

EXAMPLE II

A polymerization mixture containing the following is prepared:
(a) 91.4 parts by weight hydroxyethyl methacrylate,
(b) 8.0 parts by weight ethoxyethyl methacrylate,
(c) 0.5 parts by weight methacrylic acid, and
(d) 0.1 parts by weight azobisisobutryonitrile.

The mixture is thereafter polymerized and a contact lens formed as in Example I. After hydration in physiological saline the water content is about 38 percent, based on the weight of the hydrated lens. The oxygen permeability constant at 21° C. is about $8 \times 10 \times 11$ (cm$^2$ ml O$_2$)/(sec ml mmHg). The lens has excellent optical properties and mechanical strength.

Alternately a lens may be made by molding.

Prepare a mixture similar to that of Examples I or II. Isopropylperoxy dicarbonate may be used as initator in place of azobisisobutrylnitrile. Place the mixture in a polypropylene or polyethylene mold having a contact-lens-shaped cavity. Place mold and mixture in an oven having an inert atmosphere at about 45° C. until the mixture hardens. Raise the oven temperature so that the mold and mixture are subjected 70° C. for about one hour and to 90° C. for about 24 hours. Allow the oven to cool slowly. Open the mold and remove the contact lens. Upon hydration in physiological saline, the lens made by casting the monomer mixture in a mold is expected to have highly desirable properties similar to the lenses of Examples I or II.

It can be seen that the present invention provides hydrophilic contact lenses having high water content, high oxygen permeability, and fine optical properties. The lenses have good mechanical properties despite their high water content.

What is claimed is:

1. A hydrophilic contact lens comprising the polymerization reaction product of monomers consisting essentially of by weight on a water-free basis:
(a) 75 to 95 percent hydroxy straight-or-branched-chain C$_2$–C$_4$ alkyl monoester of acrylic or methacrylic acid;
(b) 5 to 20 percent monomer having the formula

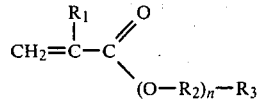

wherein R$_1$ is hydrogen or methyl, R$_2$ is C$_2$–C$_4$ straight-or-branched-chain alkylene, R$_3$ is C$_2$ to C$_4$ straight-or-branched-chain alkoxy, and n is 1; and
(c) 0.3 to 4 percent acrylic acid or methacrylic acid, wherein the weight ratio of (b) to (c) is no higher than 25 to 1.

2. The contact lens of claim 1 wherein the monomers consist essentially of:
87 to 93 percent (a),
7 to 12 percent (b), and
0.5 to 3 percent (c), wherein the weight ratio of (b) to (c) is no higher than 20 to 1.

3. The contact lens of claim 2 wherein the monomers consist essentially of:
87 to 93 percent (a),
8 to 10 percent (b), and
0.5 to 2.5 percent (c).

4. The contact lens of claim 3 wherein:
(a) is hydroxyethyl methacrylate,
(b) is ethoxyethyl methacrylate, and
(c) is methacrylic acid.

5. The contact lens of claim 4 formed by polymerizing a mixture consisting essentially of by weight on a water-free basis:
(a) 87.9 percent hydroxyethyl methacrylate,
(b) 9.8 percent ethoxyethyl methacrylate,
(c) 2.2 percent methacrylic acid, and
(d) 0.1 percent azobisisobutyronitrile.

6. The contact lens of claim 4 formed by polymerizing a mixture consisting essentially of by weight on a water-free basis:
(a) 91.4 percent hydroxyethyl methacrylate,
(b) 8.0 percent ethoxyethyl methacrylate,
(c) 0.5 percent methacrylic acid, and
(d) 0.1 percent azobisisobutyronitrile.

7. A button or bonnet adapted to be formed into a hydrophilic contact lens comprising the polymerization reaction product of monomers consisting essentially of by weight on a water-free basis:
(a) 75 to 95 percent hydroxy straight-or-branched-chain $C_2$–$C_4$ alkyl monoester of acrylic or methacrylic acid;
(b) 5 to 20 percent of a monomer having the formula

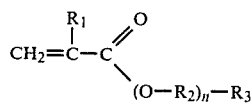

wherein $R_1$ is hydrogen or methyl, $R_2$ is $C_2$–$C_4$ straight-or-branched-chain alkylene, $R_3$ is $C_1$ to $C_4$ straight-or-branched-chain alkoxy, and n is 1; and
(c) 0.3 to 4 percent acrylic acid or methacrylic acid, wherein weight ratio of (b) to (c) is no higher than 25 to 1.

8. The button or bonnet of claim 7 wherein the monomers consist essentially of:
87 to 93 percent (a),
7 to 12 percent (b), and
0.5 to 3 percent (c), wherein the weight ratio of (b) to (c) is no higher than 20 to 1.

9. The button or bonnet of claim 8 wherein the monomers consist essentially of:
87 to 93 percent (a),
8 to 10 percent (b), and
0.5 to 2.5 percent (c).

10. The button or bonnet of claim 9 wherein:
(a) is hydroxyethyl methacrylate,
(b) is ethoxyethyl methacrylate, and
(c) is methacrylic acid.

11. The button or bonnet of claim 10 formed by polymerizing a mixture consisting essentially of by weight on a water-free basis:
(a) 87.9 percent hydroxyethyl methacrylate,
(b) 9.8 percent ethoxyethyl methacrylate,
(c) 2.2 percent methacrylic acid, and
(d) 0.1 percent azobisisobutyronitrile.

12. The button or bonnet of claim 10 formed by polymerizing a mixture consisting essentially of by weight on a water-free basis:
(a) 91.4 percent hydroxyethyl methacrylate,
(b) 8.0 percent ethoxyethyl methacrylate,
(c) 0.5 percent methacrylic acid, and
(d) 0.1 percent azobisisobutryonitrile.

13. A process for making a button or bonnet adapted to be machined into a contact lens comprising the steps of:
(a) preparing a mixture consisting essentially of:
(1) 75 to 95 percent hydroxy straight-or-branched-chain $C_2$–$C_4$ alkyl monoester of acrylic or methacrylic acid;
(2) 5 to 20 percent monomer having the formula

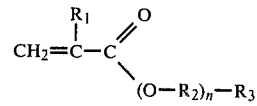

wherein $R_1$ is hydrogen or methyl, $R_2$ is $C_2$–$C_4$ straight-or-branched-chain alkylene, $R_3$ is $C_2$–$C_4$ straight-or-branched-chain alkoxy, and n is 1, and
(3) 0.3 to 4 percent acrylic acid or methacrylic acid; wherein the weight ratio of (2) to (3) is no higher than 25 to 1, and
(b) polymerizing the mixture formed in step (a) in a rod-shaped mold, and removing a polymerized rod from the mold, and
(c) cutting the rod into buttons or bonnets adapted to be machined into contact lenses.

14. A process for making a contact lens comprising the steps of:
(a) preparing a mixture consisting essentially of:
(1) 75 to 95 percent hydroxy straight-or-branched-chain $C_2$–$C_4$ alkyl monoester of acrylic or methacrylic acid;
(2) 5 to 20 percent monomer having the formula

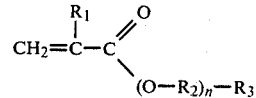

wherein $R_1$ is hydrogen or methyl, $R_2$ is $C_2$–$C_4$ straight-or-branched-chain alkylene, $R_3$ is $C_2$–$C_4$ straight-or-branched-chain alkoxy, and n is 1, and
(3) 0.3 to 4 percent acrylic or methacrylic acid; wherein the weight ratio of (2) to (3) is no higher than 25 to 1, and
(b) placing the mixture of step (a) in a mold having a contact-lens-shaped cavity,
(c) polymerizing the mixture in the mold to form a contact lens,
(d) removing the contact lens from the mold.

15. The process of claim 14 wherein
the mixture of step (a) contains isopropylperoxy dicarbonate,
the mold of step (b) is constructed of polypropylene or polyethylene,
the step (c) polymerization is carried out in an inert atmosphere at 45° C.

16. The process of claims 13, 14, or 15 wherein the mixture of monomers consists essentially of:
(a) 87 to 93 percent hydroxyethyl methacrylate, and
(b) 8 to 10 percent ethoxyethyl methacrylate, and
(c) 0.5 to 2.5 percent methacrylic acid.

* * * * *